United States Patent Office 3,043,700
Patented July 10, 1962

3,043,700
SOUFFLE MIX
Alina S. Szczesniak, Yonkers, N.Y., assignor to General Foods Corporation, White Plains, N.Y., a corporation of Delaware
No Drawing. Filed May 9, 1960, Ser. No. 27,531
8 Claims. (Cl. 99—92)

The present invention relates to a soufflé mix suitable for preparation by the housewife merely by the addition of a hydrating liquid and fresh eggs. More specifically, the invention relates to an instant soufflé mix for entree and/or dessert use which the housewife can modify by the addition of various flavoring materials.

By definition, a soufflé is a delicate, spongy hot dish made from a custard sauce into which stiffly beaten egg whites have been folded just prior to baking. Owing to the delicate nature of the soufflé, a considerable amount of skill is required in its preparation if desirable results are to be obtained.

Heretofore, the preparation of soufflés has been restricted to housewives having a high degree of culinary skill or to chefs who are well acquainted with the problems of soufflés. The average housewife generally has great difficulty in obtaining satisfactory soufflés due to the highly sensitive system which is required in the preparation of such dishes. In order to prepare a suitable soufflé, a foam must be prepared and folded into a prepared custard sauce. The foam has to be stable prior to, during and after baking of the soufflé since it has to "carry" the flavorings and the custard sauce. If the egg white is not capable of carrying the custard sauce, separation will occur with the custard sauce separating to the bottom of the baked soufflé. Viscosity and consistency of the custard sauce have to be within a critical range to produce the desired final effect. A high viscosity custard sauce results in a pasty, heavy soufflé with a low height while too low a viscosity causes settling of the sauce in the soufflé. Since the viscosity of the sauce of a home prepared soufflé depends upon the proportion of ingredients used and the extent to which the sauce is cooked, it is obvious why homemade soufflés are a true test of the housewife's culinary skill.

It is an object of the present invention to provide a mix which will permit the housewife to prepare a soufflé without going through the tedious and time-consuming steps required for the usual home preparation of a soufflé. It is a further object of the present invention to provide a soufflé mix which when rehydrated and prepared will provide a soufflé having greater tolerance and greater stability both during preparation and baking. It is yet another object of the present invention to provide a soufflé mix which requires no cooking other than baking, employs inexpensive ingredients and does not require an excessive period of time for baking.

It has now been discovered that the objects of the present invention may be obtained by preparing a two-package soufflé mix in which the first package contains dried egg white and an egg white improving agent, and the second package contains dried pregelatinized starch, water dispersible protein solids, a free flowing powdered fat, and a minor proportion of a polysaccharide which has been hydrolyzed sufficiently not to cause excessive viscosity in the mix yet insufficiently to change its polymer character so that it can still be attacked by diasatic enzymes in preference to the pregelatinized starch.

As used in the present invention, the term pregelatinized starch refers to precooked starch, as known in the trade, wherein the starch granules have been gelatinized but not to the extent that the starch granules swell unduly and burst.

The term polysaccharide as used in the present invention refers to polysaccharides obtained from starch hydrolysis such as corn syrup, corn syrup solids, potato syrup, potato syrup solids, other starch syrups, and starch syrup solids, dextrins and the like.

In carrying out the present invention, a two-package mix is prepared. The first package contains 14 to 22 and preferably 16 parts by weight of dried egg white and 0.2 to 1.0 and preferably 0.4 part by weight of an alkali metal phosphate, preferably an alkali metal hexametaphosphate. It has been found that the alkali metal phosphate, such as sodium hexametaphosphate, permits the attainment of a much finer foam and a strong supporting structure or lattice for the soufflé mix ingredients. In addition to sodium hexametaphosphate, other phosphates which may be employed are phosphates such as polyphosphates, metaphosphates, pyrophosphates, orthophosphates, as well as phytates, and the acids and acid salts thereof. Other egg white improving agents, however, may be employed to similar advantage, typically triethyl citrate, various surface active materials, the metal soaps, calcium stearate, calcium palmitate, and the like also being useful. The first package may also contain, if desired, 0.2 to 1.0 and preferably 0.5 to 0.7 parts by weight of cream of tartar. The cream of tartar provides a more stable foam, a better texture and better stability in many soufflés.

The second package is prepared by combining a gelatinized starch, a powdered fat, a protein such as milk solids, and a low weight polysaccharide.

The pregelatinized starch permits the elimination of the cooking step. Thus, it provides the desired viscosity for the soufflé without the need for cooking the custard sauce. Most of the commercially available pregelatinized starches such as potato, tapioca, corn, arrowroot and sago can be employed, and of these, it is preferred to employ pregelatinized potato starch. A starch particle size of 80 to 120 and preferably 100 U.S. standard mesh is preferred since this particle size permits easy dispersion of the mixture into the liquid used to rehydrate the ingredients. It is preferred when employing pregelatinized starch to use 10 to 30 and preferably 20 parts by weight of pregelatinized starch. However, the level of pregelatinized starch can vary considerably depending upon the type of pregelatinized starch employed and the texture desired in the basic mix. In addition to the aforementioned pregelatinized starches, any precooked starch containing material such as wheat flour, oat flour, corn flour, potato flour and the like may also be employed.

The water dispersible protein solids of the second package are typified by dried skim milk solids. It is preferred to employ 10 to 30 and preferably 20 parts by weight of water dispersible protein solids such as skim milk solids in the second package. Preferably, the skim milk solids are in an easily dispersible form and many of the commercially available instant dry milk powders may be employed. Advantageously, such milk powders can be agglomerated with the pregelatinized starch to yield a starch-protein agglomerate material characterized by its easy dispersibility in aqueous liquids which are used to rehydrate the soufflé mix. Preferably, the ratio of pregelatinized potato starch and skim milk solids is maintained at a 1:1 ratio although other ratios may be employed where other starches or proteins are used. While in the preparation of soufflés from fresh ingredients it is preferred to employ scalded milk in preparing the custard sauce, it has been found that it is not necessary to so treat the milk if it is used as the rehydrating ingredient in the present invention. Other proteins which may also be employed in the place of the skim milk solids are proteins such as sodium caseinate, calcium caseinate, casein, soy proteins and other proteins extracted from the legume family. The proteinaceous solids should be in a dispersible form and be capable of easily hydrating. The protein serves as a structure building component for the soufflé while it is baking. When a protein other than skim milk solids is employed, the level may be varied somewhat from that employed in the case of skim milk solids, such levels being determined by the particular protein employed and the texture desired in the basic soufflé.

The powdered fatty material can be any free flowing fat or fatty material capable of providing a mouth feel similar to that felt in freshly prepared soufflés employing butter. Preferably 2 to 8 and more preferably 5 parts by weight of a powdered fatty material are employed in the second package. The powdered fat or fatty material preferably is also one which possesses easy hydratability and dispersibility. It is preferred to employ a dry emulsion of hydrogenated oil, preferably cottonseed oil, containing emulsifiers and a small amount of non-fat milk solids. The fatty composition should be one which does not have a detrimental effect upon the foam system of the soufflé during baking. The emulsion of hydrogenated oil containing a partial ester of polyhydroxy compounds and fatty acids, typically mono- and di-glycerides, has been found to provide a crust of decreased sogginess and increased springiness and crunchiness in the final product.

The low molecular weight polysaccharide employed in the present invention is one which is typified by the hydrolyzates of corn starch, i.e. corn syrup or corn syrup solids, and has a dextrose equivalency of about 24. The polysaccharide employed should be one which has been hydrolyzed sufficiently not to cause excessive viscosity in the mix yet has been insufficiently hydrolyzed to change its polymer character so that it can still be attacked by diastatic enzymes in preference to the pregelatinized starch. Preferably, such polysaccharides should have an approximate molecular weight of 4300-7500. Where polysaccharides having a molecular weight of 4300-7500 and a dextrose equivalency of about 24 are employed, desirable results are obtained with the use of 30 to 50 parts by weight of such polysaccharide and more preferably by the use of 35 to 47.5 parts by weight. However, the levels of polysaccharide employed may vary considerably from such proportions depending upon the particular polysaccharide employed and the degree of dextrose equivalency.

It was unexpectedly discovered that the amylase or diastatic enzymes of the fresh egg yolk added to the mix preferentially attacked the low molecular weight polysaccharide instead of the starch. This permitted the starch to function in its normal manner and provide the required viscosity for the custard sauce. Ordinarily, the enzymes would attack and degrade the starch so it no longer functioned as a viscosity provider. Ordinarily, the reconstituted ingredients have fresh egg yolks added to them to provide the proper leavening action and baking performance required in a good soufflé. Unfortunately, however, the addition of such egg yolk in the past has provided problems since the soufflé, once permitted to stand for a short period of time, loses the viscosity which is so essential to the proper preparation of a soufflé. The precise mechanism and the contribution of the low molecular weight polysaccharide in the foregoing mixture is not well understood and the invention should not be restricted to any particular theory of operation, the foregoing description being provided only for purposes of enabling some understanding of the mechanism involved. The invention does, however, involve the employment of a polysaccharide which is similar enough to starch in its composition to act as a starch substitute for purposes of providing a focal point for the enzyme attack. The low molecular weight polysaccharide should be of such molecular weight that it does not contribute to the viscosity of the soufflé per se nor impart an excessively sweet flavor.

The following example further illustrates the present invention:

EXAMPLE 1

| | Grams |
|---|---|
| Package I: | |
|     Egg albumin | 16.200 |
|     Sodium hexametaphosphate | 0.378 |
|     Cream of tartar | 0.600 |
| Package II: | |
|     Powdered fat | 5.000 |
|     Pregelatinized potato starch | 20.000 |
|     Non-fat milk solids | 20.000 |
|     Frodex 24 D.E. | 47.500 |
|     Salt | 2.600 |
| | 95.100 |

Package I was mixed with one-half cup of water with a Mixmaster until stiff. Package II was mixed with two-thirds cup of water and two eggs and mixed with a spoon until smooth at which time flavoring materials were added. The egg whites from Package I were folded into the sauce prepared from Package II and baked in a greased casserole dish (1½ or 2 quarts) at 350° F. for 45 minutes. The resulting product was a delicate, spongy soufflé with a light brown top.

The flavoring materials which may be added to the basic soufflé are those ordinarily used in a soufflé and are exemplified by one or more of the following: sugar, fruit, meat, fish, vegetables, cocoa, chocolate, cheese, etc.

While the foregoing invention has been described by means of a specific example, reference should be had to the appended claims for a definition of the scope of the present invention.

What is claimed is:

1. A two-package soufflé mix which comprises a first package containing dried egg white and an egg white improving agent, a second package containing dried pregelatinized starch, water dispersible protein solids, a free flowing powdered fat, the minor proportion of a polysaccharide which has been hydrolyzed sufficiently not to cause excessive viscosity in the mix yet insufficiently to change its polymer character so that it can still be attacked by diastatic enzymes in preference to the pregelatinized starch.

2. A two-package soufflé mix which comprises a first package containing 14 to 22 parts by weight of dried egg white, 0.2 to 1.0 parts by weight of an alkali metal phosphate, a second package containing 10 to 30 parts by weight of pregelatinized starch, and 10 to 30 parts by weight of a water dispersible protein solids, 2 to 8 parts by weight of a free flowing powdered fat, and 30 to 50 parts by weight of a polysaccharide having an approximate molecular weight of 4300-7500.

3. A two-package soufflé mix which comprises a first package containing 16 parts by weight of dried egg white, 0.4 parts by weight of an alkali metal hexametaphosphate, 0.2 to 1.0 parts by weight of cream of tartar, a second package containing 20 parts by weight of pregelatinized starch, 20 parts by weight of a water dispersible protein solids, 5 parts by weight of a free flowing powdered fat, and 35 to 47.5 parts by weight of a polysaccharide having an approximate molecular weight of 4300-7500.

4. The composition according to claim 3 wherein the alkali metal hexametaphosphate employed in sodium hexametaphosphate.

5. The composition according to claim 3 wherein the pregelatinized starch employed in potato starch.

6. The composition according to claim 3 wherein the water dispersible protein solids employed is dried skim milk solids.

7. The composition according to claim 3 wherein the polysaccharide employed is a hydrolyzate of corn starch.

8. The composition according to claim 3 wherein the polysaccharide employed as a hydrolyzate of corn starch having a dextrose equivalency of 24.

References Cited in the file of this patent

UNITED STATES PATENTS 2,776,893    Finucane    Jan. 8, 1957
2,939,792    Kline et al.    June 7, 1960